Feb. 25, 1941.  S. MEZZAPESA  2,232,861
DEVICE FOR QUICKLY COOLING BEER AND DISPENSING SAME
Filed Nov. 22, 1938
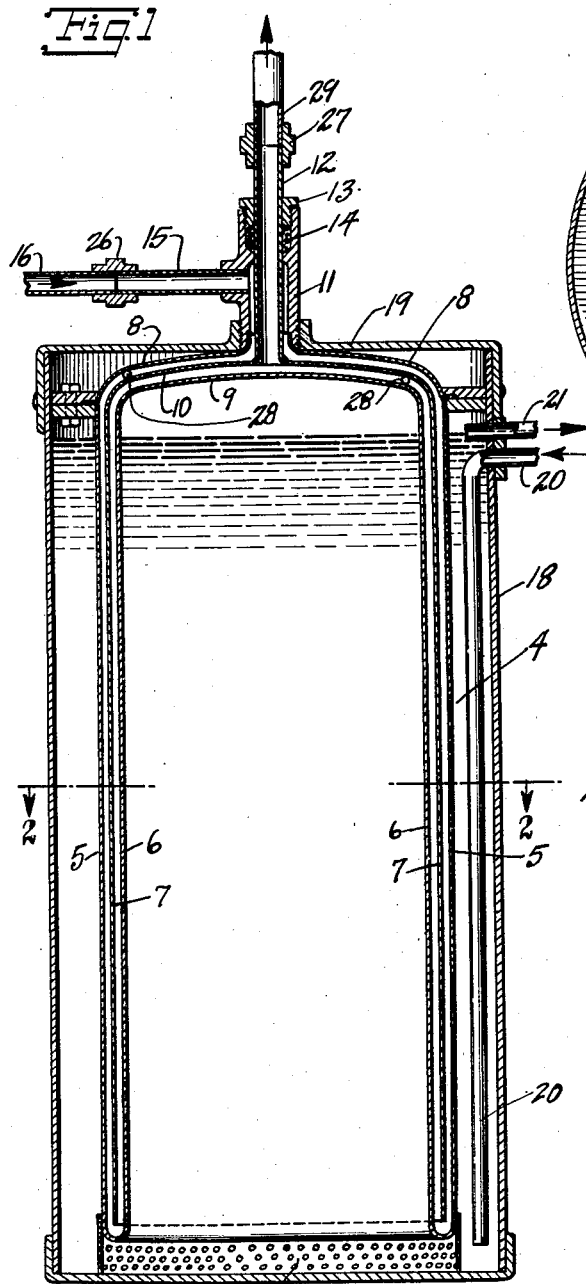
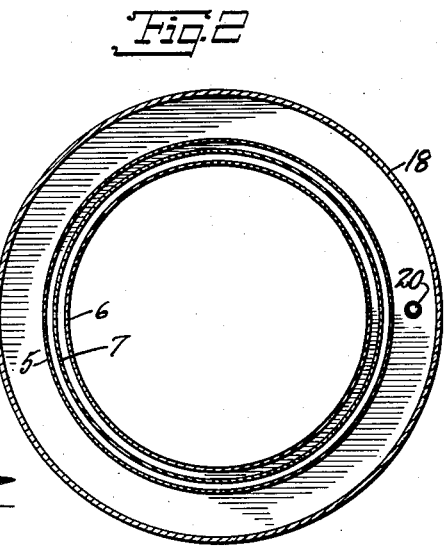
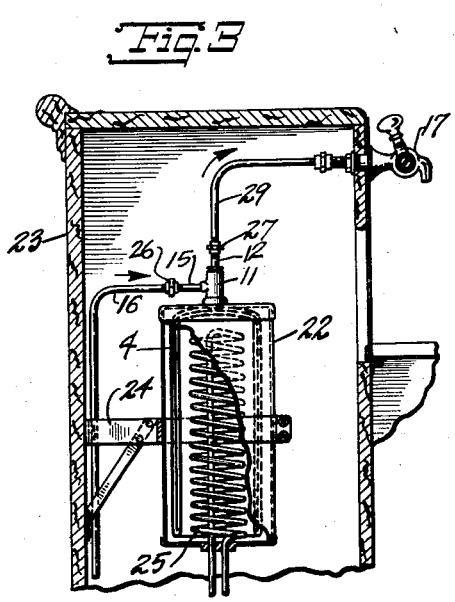
INVENTOR
Stephen Mezzapesa
BY Emanuel Scheyer
ATTORNEY Patented Feb. 25, 1941

2,232,861

UNITED STATES PATENT OFFICE 2,232,861

DEVICE FOR QUICKLY COOLING BEER AND DISPENSING SAME

Stephen Mezzapesa, New York, N. Y.

Application November 22, 1938, Serial No. 241,746

4 Claims. (Cl. 62—141)

This invention relates to a device for quickly cooling beer and dispensing same. The beer from the storage receptacle is passed between closely spaced walls which are set in a cooling medium. In my previous Patent No. 2,124,308, the beer is also passed between closely spaced walls but only a pair of walls was used with one wall in contact with the cooling medium. In the present invention three closely spaced walls are used, the beer passing between an outside wall and the middle wall and then between the middle wall and the other outside wall, both outside walls being exposed to the cooling medium, resulting in a better cooling action. The third wall provides an additional space for a reasonable amount of storage of cooled beer over the two walls used in my previous patent, yet the capacity is small enough that fresh beer is soon pulled from the storage receptacle when beer is being dispensed. The narrow space between the walls keeps down the amount of foam forming in the glass when the beer is dispensed.

My device is sanitary because it is washed readily by the circulation of water passing between the walls in either direction, that is from the discharge or dispensing end or from the beer inlet or storage receptacle end, no special inlets for cleaning water being required. The lack of sharp corners gives no place for slime to collect.

Although the description and claims herein specify beer, I wish it to be understood that the invention applies also to other liquids particularly those charged with gas, especially carbon dioxide gas.

Other objects and advantages will become apparent upon further study of the description and drawing in which:

Fig. 1 is a vertical section of the unit shown inside a cooling chamber with circulating cold water.

Fig. 2 is a horizontal section taken along the line 2—2 of Fig. 1, and

Fig. 3 is a partial section through a bar showing a unit in place, said unit having part of its walls in section, a part of the cooling chamber wall being broken away, and a refrigerating coil instead of cold water being used to effect the cooling.

The cooling unit denoted as a whole by the numeral 4 comprises outer walls 5 and 6 and intermediate wall 7 between said outer walls. These walls are substantially parallel and make up a hollow cylindrical vessel open at the bottom and closed at the top. Walls 5 and 6 extend below wall 7 and are joined at their bottom below said wall. Wall 5 has a continuation in top wall 8. Outer wall 6, which is the inner wall of the cooling vessel, has a continuation in top wall 9, while intermediate wall 7 continues around as wall 10. Balls 28 are provided to keep walls 5, 6 and 7 in spaced relation. Sleeve 11 is a continuation upward of wall 8. Sleeve 12 fits inside of sleeve 11 with a clearance around it giving rise to an annular space between said sleeves. Sleeve 12 fits in an opening in wall 10, the continuation of intermediate wall 7. The upper part of the space between said sleeves is closed by gland 13 and packing 14. Fitting into a hole in sleeve 11 is tube 15 and coupled to tube 15 by coupling 26 is pipe 16 which leads the beer in from the beer storage receptacle, not shown. The top of sleeve 12 is connected to pipe 29 by coupling 27, said pipe leading to the discharge faucet 17, Fig. 3.

Beer is led in from the storage receptacle by means of pipe 16, entering tube 15 and flowing into the space between sleeves 11 and 12. This space is in communication with the channel formed between walls 8 and 10 and their continuation 5 and 7. Said channel is in communication at the bottom of the vessel with the channel between walls 6 and 7, the beer rising up said latter channel and then flowing between top walls 9 and 10 and out sleeve 12 into discharge pipe 29.

Cooling unit 4 is mounted in a cooling chamber 18, Fig. 1. The bottom of cooling unit 4 is provided with a perforated apron 19 for resting said unit upon the bottom of chamber 18. Sleeve 11, while serving as a continuation upward of wall 8, also serves to close off the opening in removable cover 19 of chamber 18. Cold water or other cooling fluid is led into chamber 18 through pipe 20. The water circulates both inside and outside of cooling unit 4 entering the inside through perforated apron 19. After the water has circulated through cooling chamber 18 it leaves by pipe 21.

Owing to the fact that the channels between walls 5 and 7 and between walls 6 and 7 are narrow and that both walls 5 and 6 are in contact with the cooling medium, the beer is quickly and thoroughly cooled on its way through said channels. The narrowness of the channels also keeps down the foam discharged from the dispensing means 17 as explained in my above noted previous patent.

In Fig. 3 the cooling unit 4 is shown mounted in a cooling chamber 22 which in turn is mounted inside of bar 23 by means of bracket 24. Cooling chamber 22 instead of being provided with a circulation of cold water, has a refrigerating coil 25 set therein, said coil being set inside of cooling unit 4. Said coil has a cooling fluid or gas circulating inside from a refrigerating machine.

One of the great advantages of my cooling unit is the readiness with which it can be cleaned. By unscrewing coupling 26, pipe 16 may be removed and a hose connected with the city water supply attached to tube 15. Water can then be sent through the channels between walls 5, 6 and 7 and discharged from faucet 17. A water hose could be connected to faucet 17 and water discharged through pipe 15 with coupling 26 disconnected and the faucet lever turned to open position.

I claim:

1. A unit, in the form of a bell-shaped vessel, for cooling liquid, constructed of three closely spaced substantially concentric walls, the outermost and innermost of said walls being connected together at the edge of the vessel and the intermediate wall terminating short of said edge, the three walls cooperating to form a pair of annular passages communicating at said edge, an inlet being provided at the closed end of the vessel for one of said passages for introducing the liquid to be cooled and an outlet being provided for the other of said passages also at said closed end for the discharge of the liquid from the vessel, both surfaces of the vessel being in contact with cooling medium when the vessel is set in a container having cooling medium therein, liquid introduced at the inlet being conducted toward the edge of the vessel in heat exchange relation with cooling medium in contact with one of the surfaces of the vessel and then conducted in the opposite direction toward the outlet of the vessel and in heat exchange relation with cooling medium in contact with the other surface of the vessel.

2. A unit for cooling liquid constructed of three closely spaced substantially parallel walls, two of the walls being outside walls and the third being an intermediate wall located between the other two, the outside walls being connected together at one end of the unit, and the intermediate wall terminating short of said end, the three walls cooperating to form a pair of substantially parallel passages communicating at said end, an inlet being provided for one of said passages for introducing the liquid to be cooled and an outlet being provided for the other of said passages for the discharge of the liquid, both outside walls being in contact with cooling medium when the unit is set in a container having cooling medium therein, liquid introduced at the inlet being conducted toward said end in heat exchange relation with cooling medium in contact with one of the outside walls and then conducted in the opposite direction toward the outlet and in heat exchange relation with cooling medium in contact with the other outside wall.

3. A unit, in the form of a bell-shaped vessel, for cooling liquid, constructed of three closely spaced substantially concentric walls, the outermost and innermost of said walls being connected together at the edge of the vessel and the intermediate wall terminating short of said edge, the three walls cooperating to form a pair of annular passages communicating at said edge, a pipe connected to the outermost wall at the closed end of vessel, said pipe being in communication with the passage between the outermost and intermediate walls, and another pipe connected to the intermediate wall at said closed end and passing through the outer wall, said latter pipe being in communication with the passage between the innermost and intermediate walls, one of said pipes serving as an inlet for introducing the liquid to be cooled and the other pipe serving as an outlet for said liquid, both surfaces of the vessel being in contact with cooling medium when the vessel is set in a container having cooling medium therein, liquid introduced at the inlet being conducted toward the edge of the vessel in heat exchange relation with cooling medium in contact with one of the surfaces of the vessel and then conducted in the opposite direction toward the outlet of the vessel and in heat exchange relation with cooling medium in contact with the other surface of the vessel.

4. A liquid cooler comprising the combination with a substantially closed casing of a substantially bell-shaped vessel disposed within the casing and a refrigerating coil located within the vessel, said vessel being constructed of three closely spaced substantially concentric walls, the outermost and innermost of said walls being connected together at the edge of the vessel and the intermediate wall terminating short of said edge, the three walls cooperating to form a pair of annular passages communicating at said edge, an inlet being provided at the closed end of the vessel for one of said passages for introducing the liquid to be cooled and an outlet being provided for the other of said passages also at said closed end for the discharge of the liquid from the vessel, liquid introduced at the inlet being conducted toward the edge of the vessel with one of the surfaces of the vessel giving up heat of the liquid therefrom and then conducted in the opposite direction toward the outlet of the vessel with the other surface of the vessel giving up heat of the liquid therefrom.

STEPHEN MEZZAPESA.